June 6, 1950     W. G. BIEK     2,510,676
HAND TRUCK
Filed Jan. 2, 1947
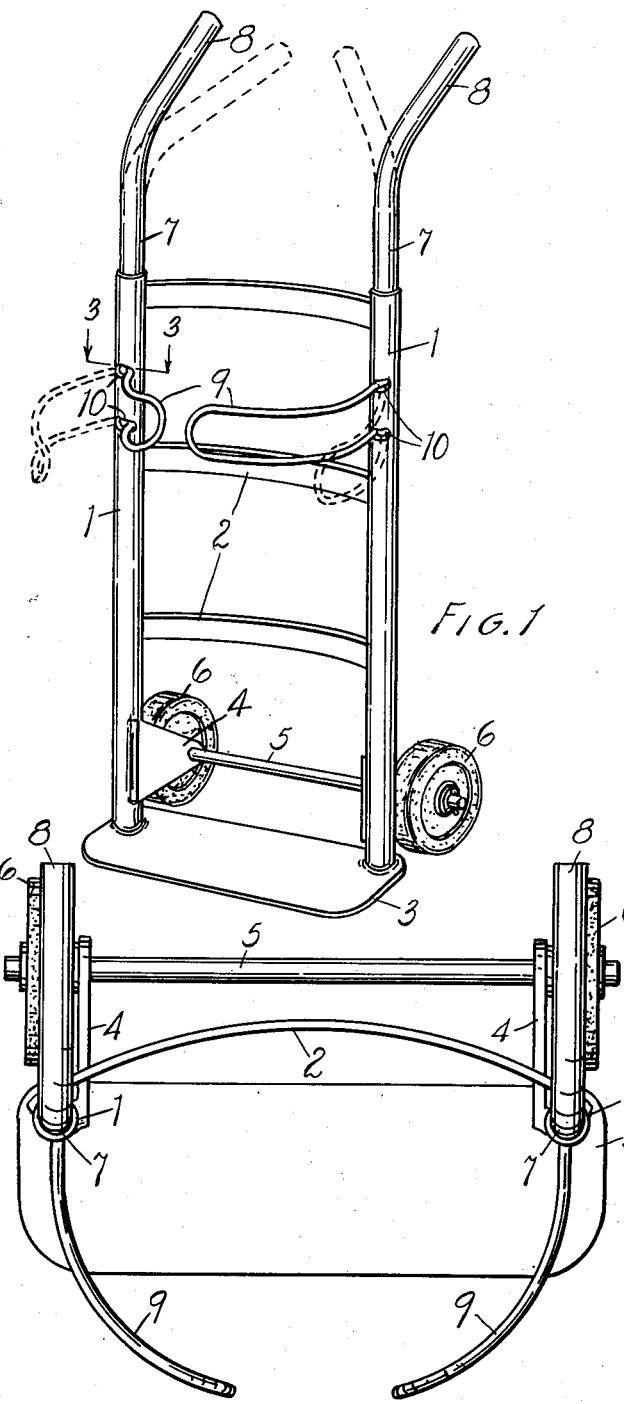
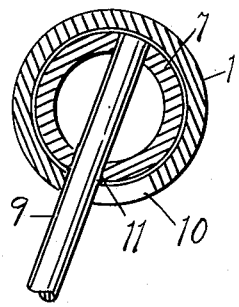
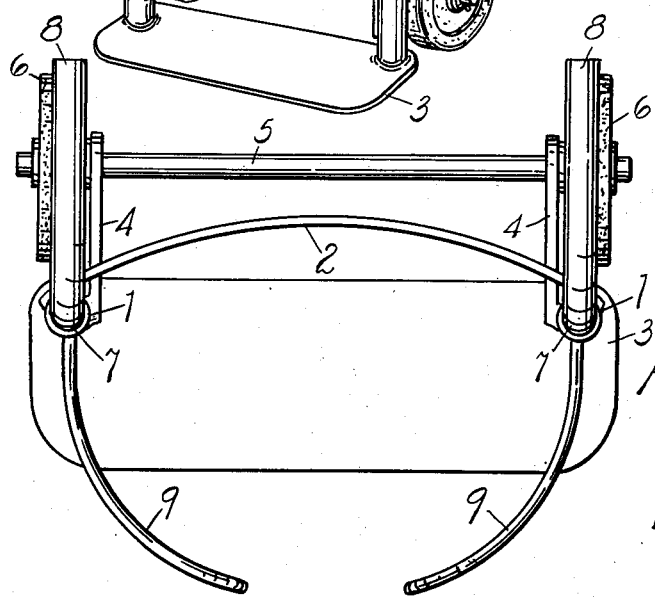
INVENTOR.
William G. Biek
BY Otto A. Earl
Attorney.

Patented June 6, 1950

2,510,676

UNITED STATES PATENT OFFICE 2,510,676

HAND TRUCK

William G. Biek, Dowagiac, Mich.

Application January 2, 1947, Serial No. 719,838

12 Claims. (Cl. 214—65.4)

This invention relates to improvements in a hand truck.

The principal objects of this invention are:

First, to provide a hand truck with load gripping arms for holding a load on the hand truck, which arms are connected to the handles of the truck and rotatable thereby into and out of load gripping position.

Second, to provide a hand truck with handles having load gripping members secured thereto which are swung into load gripping position when the handles are swung to the normal parallel operating position of the handles.

Third, to provide a hand truck with handles which are rotatable toward each other and provided with load gripping arms which are swung to open position to receive a load on the truck when the handles are moved toward each other.

Fourth, to provide a hand truck with handles which are rotatable on the truck and provided with load gripping arms so that the handles rotate the arms and so that the arms retain the handles on the truck.

Fifth, to provide a hand truck that may be used to rapidly pick up and move loads without danger of a load falling from the truck.

Other objects and advantages pertaining to the details and economies of the invention will be apparent from the following description and claims.

The drawings, of which there is one sheet, illustrate a prefered form of my hand truck.

Fig. 1 is a perspective view of the hand truck.

Fig. 2 is a top end view of the truck with the arms in closed or load gripping position.

Fig. 3 is a fragmentary cross sectional view along the line 3—3 in Fig. 1.

My hand truck consists of a pair of tubular side frame members 1 joined together by flat, slightly bowed cross members 2 and provided with a load carrying blade 3 which is welded to the bottom of the side frame members. Bracket plates 4 are welded to the lower ends of the side frame members and support an axle 5 on which hard rubber wheels 6 are rotatably mounted. Positioned telescopically within the upper ends of the side frame members are a pair of tubular extensions 7 having rearwardly bent handle portions 8. The extensions 7 are retained against axial motion in the side frame members 1 by the legs of the U-shaped arms 9 which extend through arcuate slots 10 formed in the forward sides of the side frame members and which are passed through holes provided therefore in the extensions 7. The legs of the arms 9 are welded to the extensions 7 as at 11 by means of a welding tool passed through the slots 10. The arms 9 are bent into opposing concave shape so that as the handle portions 8 are rotated outwardly away from each other, the arms 9 close across the front of the hand truck in spaced relation with the cross pieces 2 to hold a bag or other load on the truck.

The operation of the truck is extremely simple and still effectively holds a bag or load on the hand truck while the truck is being wheeled from place to place and over uneven surfaces. The operator draws the handles 8 together and tilts the truck forwardly so that the blade may be pressed underneath the load in the usual fashion. Next the operator spreads the handles 8 into their normal parallel position which swings the arms 9 around the load so that tipping the upper end of the truck backwardly in the usual manner automatically tips the load onto the truck without the operator removing his hands from the handles. The operator may then hold he handles outwardly in the normal comfortable fashion for wheeling the truck and load to any desired point, the arms 10 preventing the load from falling from the truck. The width of the arcuate slots 10 are such that the arms 9 cannot be opened beyond a generally forwardly extending position so that the operator does not need to fear the load tipping from the truck and twisting the handles 8 out of his grip. To unload the truck the operator merely brings the handles 8 together and tilts the truck forwardly.

The truck is sturdy and inexpensively manufactured from standard plate, bar and tubular stock and materially increases the speed with which an operator may pick up and unload boxes, bags, drums and other loads.

I have described a highly practical commercial embodiment of my truck and have not attempted to show various modifications thereon as it is felt that others may easily adapt the truck for such special loads as are desired without further description.

Having thus described my invention, what I claim as new and desire to secure by Letters Patent is:

1. A hand truck comprising tubular side frame members having a load carrying blade and wheels mounted on the lower ends thereof, each of said side frame members defining a pair of arcuate slots opening to the front of the truck and near the upper ends thereof, tubular extensions fitting telescopically within said side frame members and having rearwardly turned handle portions on the upper ends thereof, said extensions defining aligned apertures therethrough and opposite said arcuate slots, and a pair of load gripping arms formed of bar material bent into U-shape and having their ends extending through said slots and said apertures and welded to said extensions, said arms being oppositely and concavely curved to extend across the front of said truck in spaced relationship therewith when said handle portions are moved away from each other toward parallel positions.

2. A hand truck comprising tubular side frame members having a load carrying blade and wheels mounted on the lower ends thereof, each of said side frame members defining an arcuate slot opening to the front of the truck, tubular extensions fitting telescopically within said side frame members and having rearwardly turned handle portions on the upper ends thereof, for maneuvering the truck said extensions defining aligned apertures therethrough and opposite said arcuate slots, and a pair of load gripping arms having their ends extending through said slots and said apertures and secured to said extension, said arms being oppositely and concavely curved to extend across the front of said truck in spaced relationship therewith when said handle portions are located away from each other in parallel positions.

3. A hand truck comprising side frame members having a load carrying blade and wheels mounted on the lower ends thereof, each of said side frame members defining a transverse slot, tubular extensions rotatably and telescopically engaging said side frame members and having rearwardly extending handles on the upper ends thereof, said extensions defining aligned apertures therethrough and opposite said slots, and a pair of load gripping arms each having one end extending through one of said slots and said apertures and secured to said extensions, said arms being shaped to extend across the front of said truck in spaced relationship therewith when said handles are located in parallel positions, the ends of said slots coacting with said arms to limit the rotation of said extensions.

4. A hand truck comprising side frame members having a load carrying blade and wheels mounted on the lower ends thereof, each of said side frame members defining a transverse slot, extensions rotatably and telescopically engaging said side frame members and having rearwardly extending handles on the upper ends thereof, said extensions defining apertures opposite said slots, and a pair of load gripping arms each having one end extending through one of said apertures and secured to said extensions, said arms being shaped to extend across the front of said truck in spaced relationship therewith when said handles are located in parallel positions.

5. In combination with a hand truck having tubular side frame members, each of said side frame members defining a pair of arcuate slots near the upper ends thereof, extension members telescopically and rotatably positioned in the upper ends of said side frame members and having rearwardly, extending handle portions on the upper ends thereof for maneuvering the truck, load gripping arms of U-shaped bar material having their open ends extending through said slots and secured to said extensions for rotation with said extensions and to prevent axial movement of said extensions in said side frame members, the closed ends of said arms being curved across the front of said truck.

6. In combination with a hand truck having side frame members, each of said side frame members defining a transverse slot, extension members telescopically and rotatably carried on the upper ends of said side frame members and having angularly disposed rearwardly extending handles on the upper ends thereof maneuvering the truck and rotating the said extensions, load gripping arms having one end extending through said slots and secured to said extensions for rotation with said extensions and to prevent axial movement of said extensions on said side frame members, the free ends of said arms being curved across the front of said truck.

7. In combination with a hand truck having tubular frame members, one of said side frame members defining a transverse slot, an extension member telescopically and rotatably carried on the upper end of said side frame member having the slot and having a rearwardly extending handle on the upper end thereof for maneuvering the truck, a load gripping arm having one end extending through said slot and secured to said extension for rotation with said extensions and to prevent axial movement of said extension on said side frame member, the free end of said arm being curved across the front of said truck.

8. A hand truck having a tubular side frame member, an extension member telescopically and rotatably carried on said side frame member, a load gripping arm secured to said extension and curved across the front of said truck, and an angularly disposed rearwardly extending handle on the upper end of said extension for maneuvering the truck and rotating said extension member, said arm extending through a slot in said side frame member and engageable with the edges thereof to limit the rotation of said extension on said side frame member and to prevent axial motion of said extension on said side frame member.

9. A hand truck having a side frame member, an extension member rotatably carried on said side frame member, a load gripping arm secured to said extension and shaped to hold a load on the front of said truck, and an angularly disposed rearwardly extending handle on the upper end of said extension for maneuvering the truck and rotating said extension member, said arm extending through a slot in said side frame member and engageable with the edges thereof to limit the rotation of said extension in said side frame member and to prevent axial motion of said extension in said side frame member.

10. A hand truck having a side frame member, an extension member rotatably carried on said side frame member, a load gripping arm secured to said extension and shaped to hold a load on the front of said truck, and an angularly disposed rearwardly extending handle on the upper end of said extension for maneuvering the truck and rotating said extension member.

11. A hand truck having a side frame member, an extension member rotatably carried on said side frame member, one of said members having a transverse groove therein, the other of said members having a stop engageable with said groove to limit the rotation of said extension on said side frame member and to prevent axial motion of said extension in said side frame member, a load gripping arm secured to said extension and curved across the front of said truck, and an angularly disposed rearwardly extending handle on the upper end of said extension for maneuvering the truck and rotating said extension member.

12. A hand truck comprising side frame members having a wheel and load supporting blade mounted on the lower end thereof, extension members mounted on said frame members and rotatable thereon, the upper ends of said extension members having handle portions angularly disposed with respect to the axes of said frame members for manipulating the truck and rotating said extension members, and load gripping arms secured to said extension arms and rotatable therewith into gripping engagement with loads carried on said truck.

WILLIAM G. BIEK.

REFERENCES CITED

The following references are of record in the file of this patent:

UNITED STATES PATENTS

| Number | Name | Date |
|---|---|---|
| 920,826 | Copeland | May 4, 1909 |
| 990,187 | Bergsather | Apr. 18, 1911 |
| 2,131,426 | Croff | Sept. 27, 1938 |
| 2,235,044 | Ronning | Mar. 18, 1941 |
| 2,381,858 | Austin | Aug. 14, 1945 |
| 2,478,196 | Johnston et al. | Aug. 9, 1949 |